United States Patent [19]
Merkley et al.

[11] Patent Number: 5,535,334
[45] Date of Patent: Jul. 9, 1996

[54] FAULT-TOLERANT SYSTEM-TO-SYSTEM COMMUNICATIONS SYSTEM AND METHOD UTILIZING MULTIPLE COMMUNICATIONS METHODS TO TRANSFER A SINGLE MESSAGE

[75] Inventors: Kevin L. Merkley, Longmont; Kurt G. Schumacher; Alan R. Sutton, both of Boulder, all of Colo.

[73] Assignee: Storage Technology Corporation, Louisville, Colo.

[21] Appl. No.: 466,236

[22] Filed: Jun. 6, 1995

Related U.S. Application Data

[63] Continuation of Ser. No. 10,793, Jan. 29, 1993, abandoned.
[51] Int. Cl.⁶ .................................................. G06F 13/00
[52] U.S. Cl. ................ 395/200.15; 395/858; 370/95.1; 340/827; 364/230; 364/241.9; 364/260.1; 364/DIG. 1
[58] Field of Search ........................ 395/800, 732, 395/860, 858, 200.15, 200.13, 200.03, 184.01, 183.16, 180; 370/54, 60.1, 85.6, 85.7, 95.1; 371/8.2, 11.2, 68.2; 364/514, 704, 705.5; 340/825.03, 827

[56] References Cited

U.S. PATENT DOCUMENTS

| | | | |
|---|---|---|---|
| 5,212,792 | 5/1993 | Gerety et al. | 395/650 |
| 5,230,051 | 7/1993 | Quan | 395/700 |
| 5,253,342 | 10/1993 | Blount et al. | 395/200 |
| 5,287,456 | 2/1994 | Rhodes et al. | 395/200 |
| 5,313,638 | 5/1994 | Ogle et al. | 395/725 |

OTHER PUBLICATIONS

Pat Roddy, "L–COMM: Intersystems Communications for a Multiple Product Environment", presented at LEGENT VIP Users Conference, Session 166, 1990, including copy of brochure and slides.

Primary Examiner—Alyssa H. Bowler
Assistant Examiner—Alpesh M. Shah
Attorney, Agent, or Firm—Sterne, Kessler, Goldstein & Fox

[57] ABSTRACT

A tiered communications service which utilizes multiple methods of communication and provides the ability for different host computer systems to pass dam, unconcerned with the type of communications medium used by the service. Each method of communication is ranked according to its preference within the service. When the communications service encounters an error while attempting to send data to another host system, it performs an automatic switch to the method with the next lower preference which is available for use. The service sends notification to the other system of the change in communications method used and which method to start using, then continues sending the data. The communications method may be switched to a higher or lower preferred method explicitly by operator command, which also sends notification to the other systems of a change in method. Each host system has the ability to communicate with other host systems via various communications methods, depending on the methods defined to the service. A host system can communicate with a second host system using one communications method and communicate with a third host computer system using a different communications method. To communicate between any two host systems, the service utilizes the highest preferred common communications method available for use, except when changed by operator command.

21 Claims, 14 Drawing Sheets

5,535,334

FAULT-TOLERANT SYSTEM-TO-SYSTEM COMMUNICATIONS SYSTEM AND METHOD UTILIZING MULTIPLE COMMUNICATIONS METHODS TO TRANSFER A SINGLE MESSAGE

This application is a continuation of application Ser. No. 08/010,793, filed Jan. 29, 1993, now abandoned.

BACKGROUND OF THE INVENTION

1. Field of the Invention

The present invention relates generally to communications between host computer systems and, more particularly, to a communications service system utilizing prioritized multiple communication methods.

2. Related Art

Presently, communications between applications residing in different host computer systems normally use a single method of communications. Alternatively, they may use more than one communications method, but this requires program logic for each communications method used. Typically, the two applications pass data via a specific method of communications. If an error occurs while attempting to send data, the data transmission ceases and an error is returned to the requesting application. The error then has to be corrected prior to the remaining data being sent to the receiving application. If the host computer system has the program logic for more than one communications method and an error occurs, then the application has to use different logic to use another method of communications.

This reliance on a single communication method, or separate logic for different communications methods, reduces the reliability of communications. It may also increase the time to complete the communication should an error occur. One conventional approach which is limited to a single method of communication between two host computers is L-Comm, manufactured by LEGENT Corp., Pittsburgh, Pa.

What is needed is a communications system and method which enables sending and receiving applications residing on different host computer systems to reliably and efficiently communicate with each other over multiple communications methods. In addition, what is needed is a communications system which utilizes presently-available communications methods and removes the burden of performing the necessary processing to use the multiple communications methods from the sending applications programs.

SUMMARY OF THE INVENTION

In the present invention, a computer-based system and method to perform host-to-host communications over multiple communications methods is implemented. The communications service program of the present invention has a communications service associated with each host computer system for processing communications requests from the resident application programs to communicate with remote application programs residing on remote host computer systems. The communications service interfaces with the resident application programs through an interface routine which provides the communications service with the necessary data to perform the requested communications function. The communications service determines which of the communications methods supporting communications between the host computer systems are available and then prioritizes the available communications methods based on user-assigned preferences.

The communications service performs all the necessary processing to select, transmit, and receive data over single or multiple communications methods using the protocol of the selected method. If the data transmission was not successful using the selected communication method, the communications service automatically switches to an alternative communications method to complete the data transmission. The communications service on the sending host computer system then notifies the communication service on the receiving host computer system which of the available communications methods was selected as the alternative communications method, and continues the data transfer. The communications service therefore enables an applications program to communicate over a fault-tolerant communications system with multiple remote applications programs residing on multiple remote host computer systems.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

I. Overview of The Invention

The present invention enables a host computer system to communicate via multiple communications methods. The present invention assigns a preference level to each available communications method, and is capable of changing the present communications method automatically if an error occurs or by user invocation. This enables a fault-tolerant, tiered communications system to be established between multiple host computer systems. The communications service program of the present invention operates in a manner which is transparent to the host computer system and the user.

Figure 1:
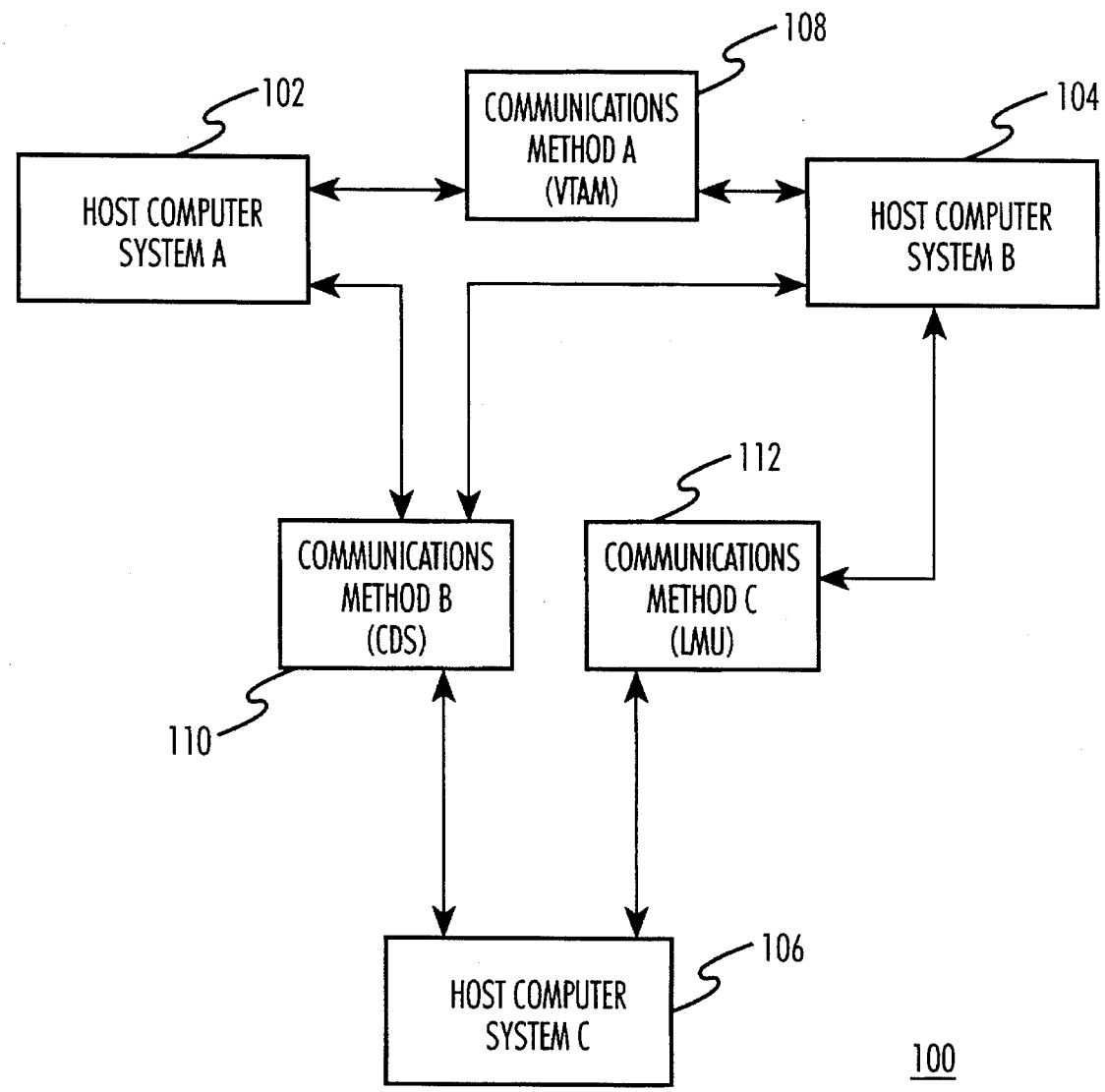
FIG. 1 is an interface block diagram illustrating the system architecture in which the preferred embodiment of the communications service program and interface routine of the present invention is implemented.

FIG. 1 illustrates the configuration in which the preferred embodiment of the present invention operates. This configuration is implemented in the Automated Cartridge System (ACS), manufactured by Storage Technology Corporation, Louisville, Colo., and is fully described in U.S. Pat. Nos. 4,864,511 and 4,928,245 to Moy, et al., herein incorporated by reference in their entirety.

In FIG. 1, three communications methods are utilized to facilitate communications between multiple host computer systems. Communications method A 108 is a Virtual Telecommunications Access Method (VTAM) communications method, manufactured by International Business Machines, Poughkeepsie, N.Y. For a description of the VTAM communications method, see "VTAM Programming," IBM Document No. SC31-6409, and "VTAM Programming For LU 6.2," IBM Document No. SC31-6410, herein incorporated by reference in their entirety.

Communications method B 110 is a Control Data Set (CDS) communications method. CDS is a communications method used in the ACS system referenced above. The CDS communications method is a method of storing message data on a shared, Direct Access Storage Device (DASD) by one host computer system, and retrieving the same message data by a different host computer system. The DASD (disk) is a very common device used for storing and retrieving data, and is used by almost all computer systems. In the preferred embodiment of the present invention, CDS utilizes a data set (file) format which contains control information used by the subsystem applications of the host computer systems to direct the operations of the ACS system. In the system illustrated in FIG. 1, the subsystem application which uses the preferred embodiment of the present invention is referred to as a Host Software Component (HSC). The HSC is designed to specifically operate in the ACS system.

Communications method C 112 is a Library Management Unit (LMU) communications method. An LMU is an integral part of the ACS system. The LMU is comprised of 1–16 connections or ports, each emulating an IBM 3278 model 2 terminal. The LMU acts as the interface between the HSC and the library hardware in the ACS system. HSCs are connected to the LMU by one or more ports, typically one or two ports per host computer system.

Additional or alternative communication methods may be implemented with the present invention, such as Transmission Control Protocol (TCP), Internet Protocol (IP) and User Datagram Protocol (UDP). For a description of TCP and IP, see Comer, "Internet Working with TCP/IP," Volume 1, Prentice-Hall (1988), herein incorporated by reference in its entirety. For a description of IP, see Postel, J., C. A. Sunshine, and D. Cohen, "The ARPA Internet Protocol," *Computer Networks,* Vol. 5, No. 4, July, 1981, herein incorporated by reference in its entirety. Implementation of other communications methods which satisfy the requirements of a particular application would be apparent to a person skilled in the relevant art. Typically, the requirements of a particular application are determined by the given set or subset of host computer systems. Two of the more commonly important criteria are the speed and transmission capacity of the communications method.

In the preferred embodiment of the present invention, host computer systems 102, 104, and 106 are IBM System 370 computer systems. These host computer systems have been configured to operate as part of the ACS system by hosting the Host Software Component (HSC) subsystem applications introduced above. The preferred embodiment may be implemented to expand the communications of any IBM or IBM-compatible computer systems, including mainframes, mini- or microcomputers, executing either Multiple Virtual Storage (MVS), Virtual Machine (VM), or compatible operating systems. However, the implementation of the present invention to expand communications of any type of computer system would be apparent to a person skilled in the relevant art. The use of the present invention is limited only by the availability and compatibility of the communications methods between the host computer systems.

The communications service program of the present invention is a computer-based software program which resides in each of the host computer systems discussed above. The present invention may be implemented in any software language and reside on any computer hardware platform without changing the functionality or scope of the present invention.

As can be seen in FIG. 1, host computer system A 102 may communicate with host computer system B 104 via the VTAM communications method 108 and the CDS communications method 110. Host computer system A 102 may communicate with host computer system C 106 only via the CDS communications method 110. Host computer system B 104 may communicate with host computer system C 106 via the LMU communications method 112 or the CDS communications method 110. Thus, in the configuration illustrated in FIG. 1, the CDS communications method 110 is common to all three host computer systems, while the VTAM and LMU communications methods are restricted to specific host-to-host communications. This illustrates the capability of the present invention to simultaneously support communications between one host computer system and a remote host computer via one set of communications methods and between the same host computer system and a different remote host computer via a second set of communications methods. The communications methods used for one host-to-host communications may or may not be the same as those used for the other host-to-host communications.

Figure 2:
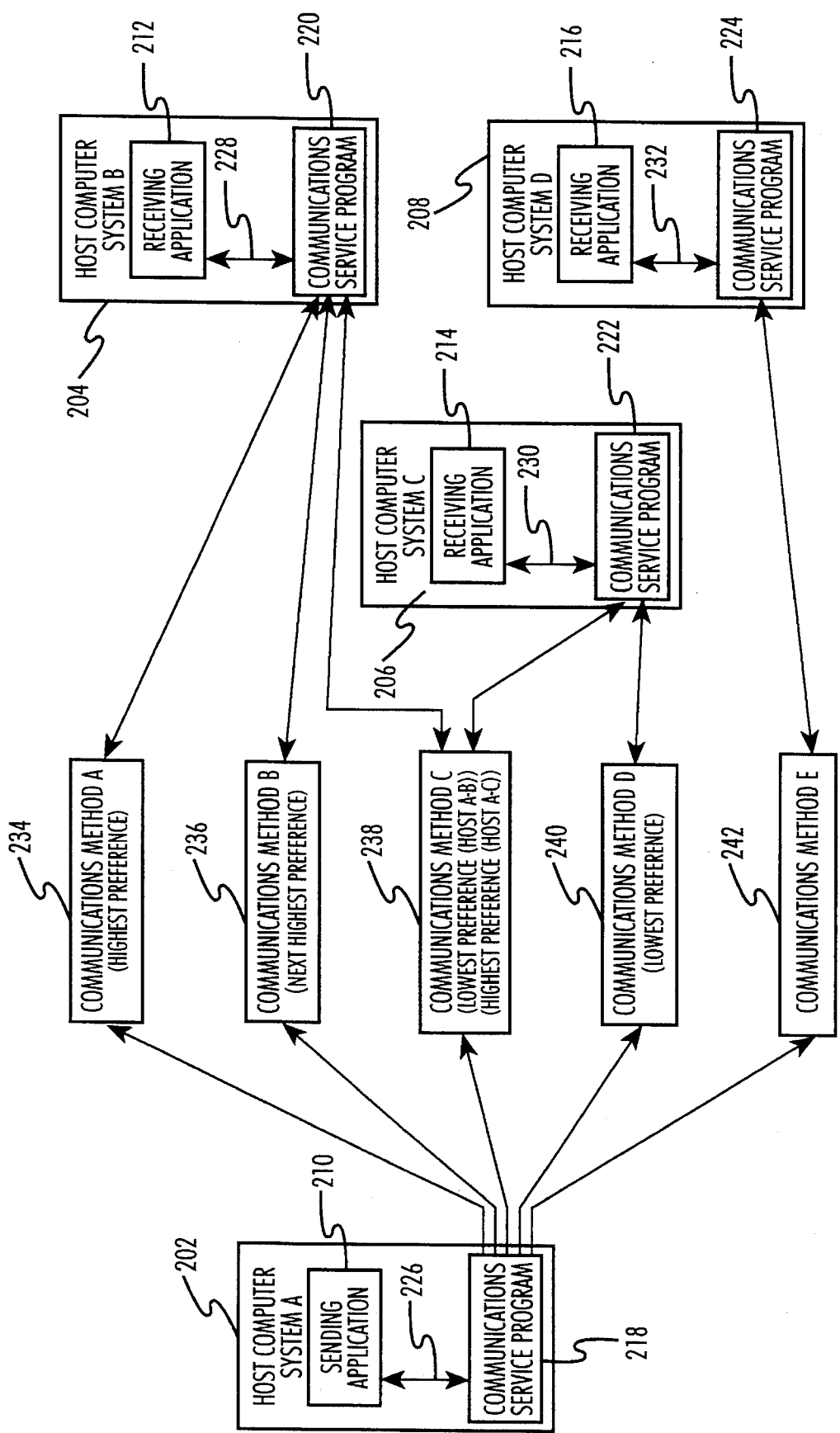
FIG. 2 is an interface diagram of a system configuration including multiple host computer systems and communications methods.

The operation of the present invention shall be described with reference to a fictitious data transfer between the host computer systems illustrated in FIG. 2. FIG. 2 illustrates a system configuration of four host computer systems and five communications methods. The host computer systems and communications methods illustrated in FIG. 2 are equivalent to those of described above with reference to FIG. 1.

In the configuration of FIG. 2, a fault-tolerant, tiered communications system exists between host computer system A 202 and host computer system B 204. Host computer system A 202 may communicate with host computer system B 204 via any one of the three communications methods connecting the two host computer systems: communications method A 234, communications method B 236, or communications method C 238.

The communications methods for each host-to-host communication are assigned a relative preference according to operating characteristics such as speed and capacity. In the present example, communications method A 234 is designated as the highest preference communications method for communications between host computer system A 202 and host computer system B 204. Communications method B 236 is the next highest preference communications method, and communications method C 238 is the lowest preference communications method.

A fault-tolerant, tiered communications system also exists between host computer system A 202 and host computer system C 206. For the communications between host computer system A 202 and host computer system C 206, communications method C 238 and communications method D 240 are available. Communications method C 238 is the highest preference communications method for communications between these two host computer systems, whereas it was the lowest communications method for communications between host computer system A 202 and host computer system B 204. Communications method D 240 is the lowest preference communications method available for communications between host computer system A 202 and host computer system C 206.

For communications between host computer system A 202 and host computer system D 208, there is a single communications method available: communications method E 242.

Host computer systems A through D (202, 204, 206, and 208) contain application programs 210, 212, 214, and 216, respectively. In this example, application program 210, residing in host computer system A 202, is sending data to application programs 212, 214, and 216. The application programs are referenced throughout this fictitious example according to their function. Thus, application program 210 is referred to as sending application 210 and applications programs 212, 214, and 216 are referred to as receiving applications 212, 214, and 216, respectively. In the preferred embodiment of the present invention, the application programs are the Host Software Component (HSC) applications discussed above. However, application programs 210, 212, 214, and 216 may be any type computer-based static or dynamic processes, such as databases or real-time programs, particularly applications which are required to share data or resources.

To perform communications over a tiered (prioritized) communications system comprised of multiple communications methods, each host computer system contains a communications service program of the present invention. Host computer systems A through D (202, 204, 206, and 208) are comprised of communications service programs 218, 220, 222, and 224, respectively. As will be discussed below, once an application program issues a request through a single interface (lines 226, 228, 230, and 232, respectively) to the communications service program of the present invention, the communications service program performs the transmission and reception of dam according to the protocol of the different communication methods available. These communication functions are performed solely by the communications service program of the present invention. The application programs are not aware of the communications method or methods used to send and receive the data to and from the other host computer systems.

The communications service program interface with the applications program is first presented below. Next, the host-to-host communications process for sending and receiving data are described. Finally, each of the routine and subroutine components of the communications service program are described.

II. Communications Service Program Interface

In the preferred embodiment of the present invention, the application programs interface with the communications service program residing on the same host computer system via a single interface when they communicate with applications programs residing on another host computer system. This interface is depicted in FIG. 2 as communications lines 226, 228, 230, and 232 in host computer systems 202, 204, 206, and 208, respectively.

In the preferred embodiment, the application programs are required to be modified in order to make the proper call to the communications service program. Once the application programs have the program logic to use the communications service program of the present invention, there would be no need to modify the application program again if the communications methods used should be changed. For computer environments wherein the communications methods are invoked from within the operating system, the application programs may not need to be modified since they do not directly request the use of communications services.

In the preferred embodiment, an interface routine is implemented to receive requests for the communications service program from the applications program(s). The interface routine then passes a data structure to the communications service program containing the data elements which are applicable to the specific request. As discussed above, the preferred embodiment of the present invention operates on an IBM mainframe computer system. In IBM mainframe Assembler language, the data structure which is passed from the interface routine to the communications service program is called a parameter list. The fields of the parameter list which are pertinent to the present invention are depicted below in Table 1. The order of fields in the parameter list shown in Table 1 is not mandatory. Modifying the sequence of the fields within the parameter list within the limits of the IBM mainframe Assembler language would be apparent to a person skilled in the relevant art.

TABLE 1

| FIELD | No. of BYTES | CONTENTS | |
|---|---|---|---|
| 1 | 4 | Length of the entire parameter list. | |
| 2 | 1 | Request function code (HEX value) which identifies the type of request. | |
| | | 1 = | Define Host: defines the communications parameters for a host computer. |
| | | 2 = | Query Host: obtains a list of defined host computers or information about a specific host computer's communications parameters. |
| | | 3 = | Register: Registers with the communications service program that the application program is to be notified when data is received from other systems. |
| | | 4 = | Deregister: identifies the registration which is to be removed, disallowing the application from receiving data. |
| | | 5 = | Send: requests to send data to other host computer(s). |

TABLE 1-continued

| FIELD | No. of BYTES | CONTENTS | |
|---|---|---|---|
| | | 6 = | Obtain: requests to obtain data received from other host computer system(s). |
| 3 | 1 | Flag byte. Each bit is either 0 or 1, indicating the presence or absence of a condition. Presently, only the first bit is used. | |
| | | | Bit 1 : 0 = Delete define host information |
| | | | 1 = Delete not specified |
| 4 | 4 | Length of data to send for a Send request or Maximum length of data area to place received data for an Obtain request. | |
| 5 | 4 | Pointer to data area for Send or Obtain requests. | |
| 6 | 4 | Pointer to Event Control Block (ECB). The ECB is specific to IBM System 370 operating systems. It notifies the application program when data is received from other host computer systems. | |
| 7 | 4 | Registrant identifier token. Identifies the specific application process which is to receive data. A single application may have more than one process which would need to register for the same or different messages. | |
| 8 | 4 | Message type code. | |
| 9 | 4 | Current communications method for specified host system. | |
| 10 | 2 | Current LMU identifier for specified host system. | |
| 11 | 8 | VTAM name for specified host system. | |
| 12 | variable | Host system identifiers. | |
| | | 4 bytes: | No. of host system identifiers (no. of fields) |
| | | 8 bytes: | Host system identifier (one for each host system specified) |
| 13 | variable | List of communications methods. | |
| | | 4 bytes: | Count of communication methods in following list (no. of fields) |
| | | 4 bytes: | Communications method (allowed for use by the host system specified) |
| 14 | variable | List of LMU identifiers. | |
| | | 4 bytes: | Count of LMU identifiers in following list (no. of fields) |
| | | 4 bytes: | LMU identifier (allowed for use by the host system specified) |

In the preferred embodiment of the present invention, the interface routine is the method by which the present invention builds the above data structure. However, as would be apparent to a person skilled in the relevant art, the application programs may be designed to build the data structure themselves and to perform the call to the communications service program directly. In addition, the interface routine may take on any form necessary to facilitate the communications between the communications service program and the applications program(s).

III. Message Transmission The host-to-host communications process is now described from the perspective of the host computer system in which the sending application resides with reference to FIG. 3 and the fictitious host-to-host communication discussed above. The communications service program establishes and maintains a connection with each of the communications methods available to the host computer system in which the sending application program resides (referred to as the sending system). All communication functions performed by the communications service program are performed transparently to the user processes and applications program(s) (discussed below). In the present example, sending application 210 interfaces with communications service program 218 to transfer data from sending application 210 to receiving applications 212, 214, and 216.

Figure 3:
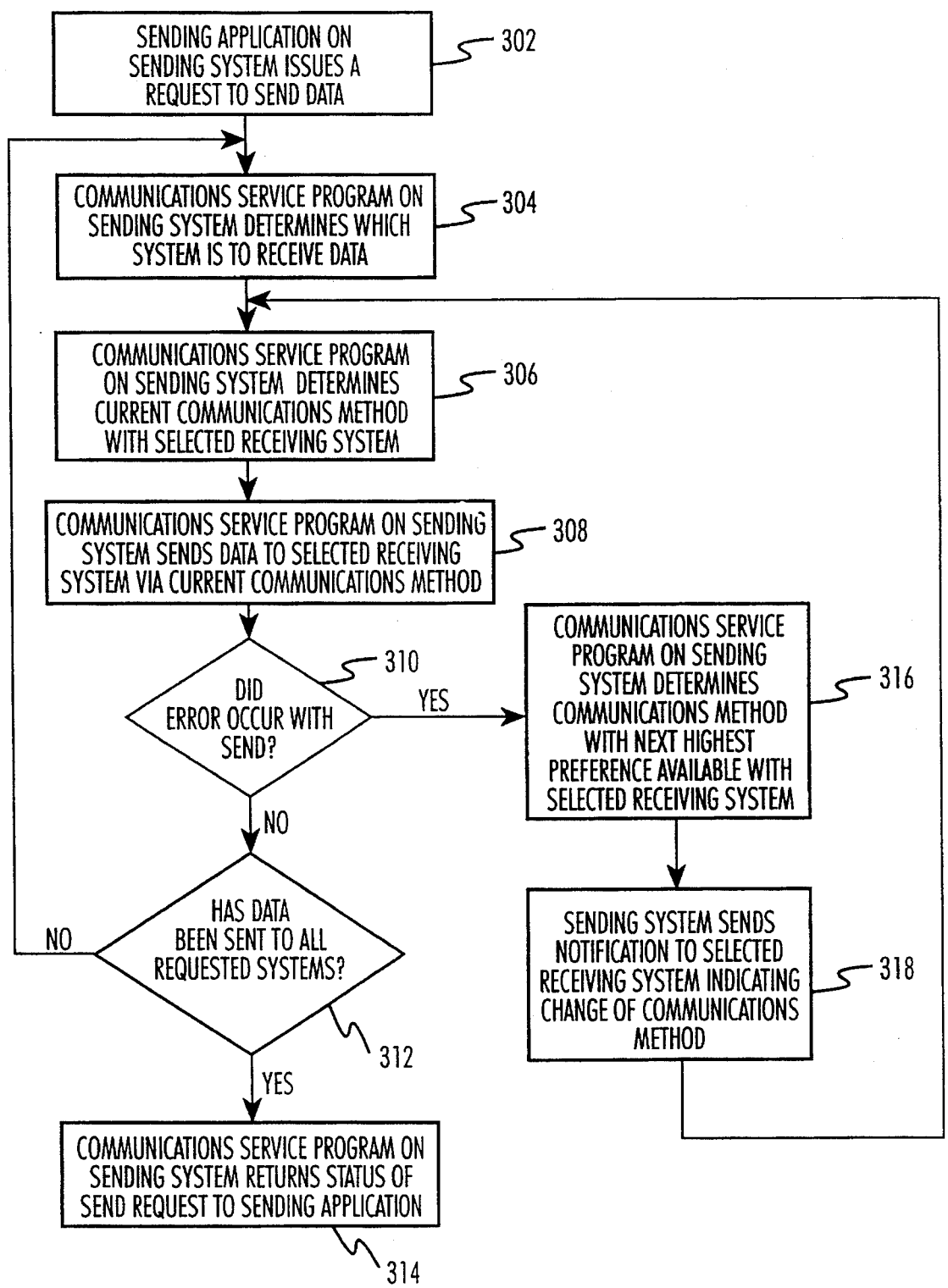
FIG. 3 is a flowchart illustrating the functional steps which are taken to send data over a tiered communications utilizing the communications service program of the present invention.

Referring to FIG. 3, when a sending application is required to send data to a receiving application, it issues a send data request to the communications service program, step 302. The send data request is a parameter list with the request function code (see Table 1, field 2) set to a five (5). The sending application also specifies which host computer systems are to receive the message in the send data request (see Table 1, field 12). The communications service program then examines the arguments of the parameter list which are passed in the send data request to determine which host computer systems were specified by the sending application, step 304. In the preferred embodiment of the present invention, the sending application may specify one or more specific host computer systems to receive the message, or it may specify that all available host computer systems receive the message. However, as would be apparent to a person skilled in the relevant art, the sending application and communications service program may be configured to enable the sending application to specify receiving applications in addition to specifying receiving host computer systems. In the present example, the request to send data from sending application 210 indicates that the data is to be sent to host computer system B 204, host computer system C 206, and host computer system D 208. When the communications service program 218 receives the request, it identifies the above host computer systems as those required to receive the data.

For each receiving host computer system(s), the communications service program determines which communications methods are available, and from those, which is the highest preference communications method available at that time, step 306. During the initialization process, each host computer system attempts to communicate with each interfacing host computer system via each of the defined communications methods for that particular host-to-host communications. A communications method is considered to be available when the communications service program successfully establishes a connection with that communications method. The communications service program then communicates over the available communications methods which has the highest preference. This communications method is referred to as the current communications method. The current communications method for a specified host-to-host communications is set during this initialization process when the communications service program determines which communications methods are available. In the present example, for host computer system A 202 to host computer system B 204 communications, communications methods A through C (234, 236, and 238) are available, of which communications methods A 234 has the highest preference. Therefore, communications method A 234 will be selected as the current communications method for host-to-host communications between host computer system A 202 and host computer system B 204.

The communication service program residing on the sending system then sends the data from the sending system to the selected receiving system, using the protocol of the chosen communications method, step 308. In the present example, communications method A 234 is the current communications method. Therefore, host computer system A 202 sends data to host computer system B 204 via communications method A 234.

Using the particular error correction capability of the chosen communications method, the communications service program then determines if the data transmission was completed successfully, step 310. In the present example, communications service program 218 in host computer system A 202 will use the error checking capability of communications method A 234 to determine if the data transmission occurred successfully.

After the data transmission is completed, the communications service program then determines if the data has been sent to all of the designated receiving host computer systems, step 3 12. If not, the communications service program 218 then sequentially sends the data to each of the remaining receiving host computer systems. In the present example, if the data transfer from host computer system A 202 to host computer system B 204 over communications method A 234 was successful, the communications service program would then send the data to the next receiving system specified. In the present example, host computer system C 206 would be the next receiving system. In the preferred embodiment of the present invention the communications service program does not assign a preference to each of the host computer systems which are to receive the data transmission, sending the data sequentially to each of the specified host computer systems. However, would be apparent to a person skilled in the relevant art, the communications service program may implement any type of prioritization scheme in determining the order of specified host computer systems to transmit the data to.

When the communications service program determines that an error has occurred while communicating over the current communications method, step 310, then the communications service program immediately suspends communications with the receiving system and determines which of the remaining communications methods available for this host-to-host communications has the next highest preference, step 316. If only a portion of the data for the message was sent at the time of the error, the communications service program notes which blocks of data were successfully transmitted and which blocks of data are still pending. In the present example, when an error occurs, communications service program 218 residing on host computer system A 202 evaluates the remaining communications methods available for communications between host computer system A 202 and host computer system B 204. As illustrated in FIG. 2 and discussed above, communications method B 236 is the communications method which has the next highest preference level after communications method A 234. Therefore, communications method B 236 would become the new current communications method.

In the preferred embodiment, the communications service program attempts to establish a connection to the communications methods which are defined for the host computer system during initialization and when the operator requests that the host computer system switch to a different communications method which had previously had an error. Alternatively, the communications service program may be configured to periodically poll the communications methods which were defined for a specific host-to-host communications but are not available.

Thus, the communications service program attempts to establish and maintain a connection with each of the defined communications methods over which it is to communicate. Once the communications service program on the sending system determines the new current communications method, step 316, it notifies the communications service program on the receiving system via the new current communications method that it will be sending future data communications over the new current communications method, step 318. In the present example, communications service program 218 notifies communications service program 220 via communications method B 236 that the new current communications method will be communications method B 236.

When the communications service program on the sending system receives notification that the communications service program on the receiving system has changed its communication parameters to receive data over the new communications method, the communication service program on the sending system then continues the data transmission over this new current communications method. In the present example, all subsequent communications between host computer system A and host computer system B will be over communications method B 236.

After the communications service program performs the communications method switch processing, the communications service program then repeats its determination of the current communications method because the current communications method may have switched again while the communications service program was sending notification of the switch in communications methods.

If no error has occurred with the transmission, step 310, and the communications service program has determined that there are no designated receiving systems to which data has not been sent, step 312, then the communications service program on the sending system returns a status of the send request to the sending application indicating if the data was successfully sent to the specified receiving systems. In the present example, communications service program 218 returns a status to sending application 210 indicating that the data was successfully sent to host computer system B 204, host computer system C 206 and host computer system D 208.

IV. Message Reception

Figure 4:
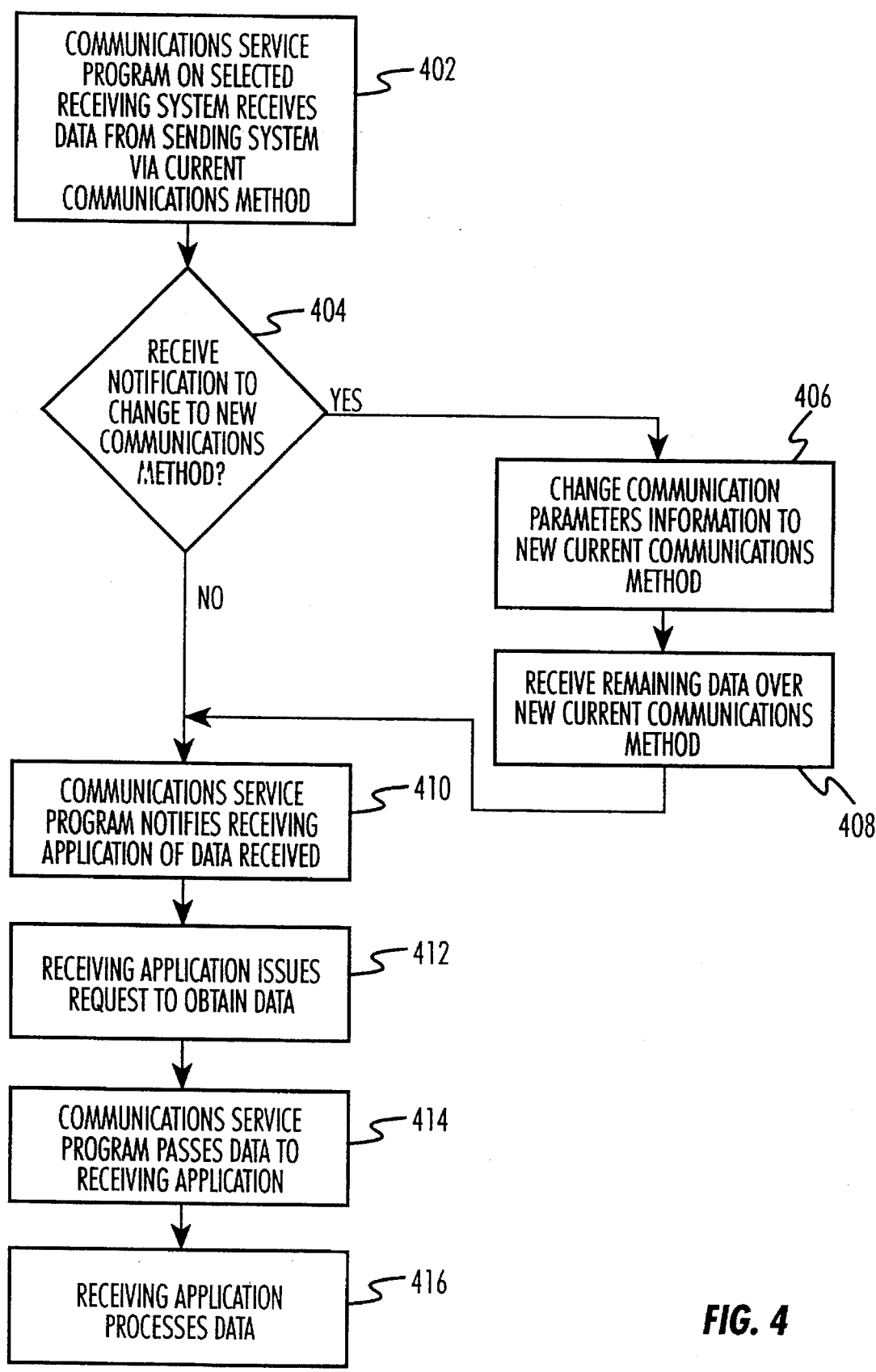
FIG. 4 is a flowchart illustrating the functional steps which are taken to receive data over a tiered communications utilizing the communications service program of the present invention.

Referring to FIG. 4, a flowchart of the process flow performed to receive data utilizing the present invention is illustrated. The process will be described with reference to FIG. 2 and the present example, wherein communications service program 220, residing in host computer system B 204, receives the data sent from communications service program 218, residing on host computer system A 202.

As discussed above with reference to message transmission, the current communications method is established during the initialization process and when the operator requests a switch to a communications method in which an error had occurred previously. The communications service program on the receiving system receives data over the highest preference communications method available. However, since it maintains a connection with all defined communications methods, it is able to detect incoming communications over any of the available communications methods.

First, the communications service program receives data over the current communications method, step 402. If the communications program receives all the data over the current communications method and does not receive notification that the remaining data will be sent over a different communications method, step 404, it notifies the designated receiving application that data has been received, step 410. Once notified, the receiving application issues a request to obtain the data to the communications service program, requesting it to transfer the data to the location indicated in the parameter list (see Table 1, fields 2, 4, and 5), step 412. The communications service program then passes the data to the receiving application, step 414. Once the data transfer is completed, the receiving application then processes the data, step 416. In the present example, communications service program 220 receives data over communications method A 234 from communications service program 218 residing on host computer system A 202. Communications service program 220 then notifies the designated receiving application 212 over the internal communications path 228 that it has received data designated for it. Upon receiving notification, receiving application 212 then returns to communications service program 220 an obtain data request. Communications service program 220 then transfers the data to receiving application 212, where it is processed.

If the communications service program on the receiving system receives notification that the current communications method is going to change, step 404, it then changes its communications parameters in order to continue communications with the sending system over the new current communications method specified by the notification, step 406. Once this is accomplished, all future communications with the sending communications service program will occur over this new current communications method, step 408. In the present example, communications service program 220 receives notification from communications service program 218 over communications method B 236 that data will subsequently be sent via the new current communications method, communications method B 236. Communications service program 220 then changes its communications parameters to communications method B 236 for communications between communications service program 218 and communications service program 220. The process of changing the communications parameters is discussed below with reference to the receive routine of the communications service program.

V. Component Descriptions

Figure 5:
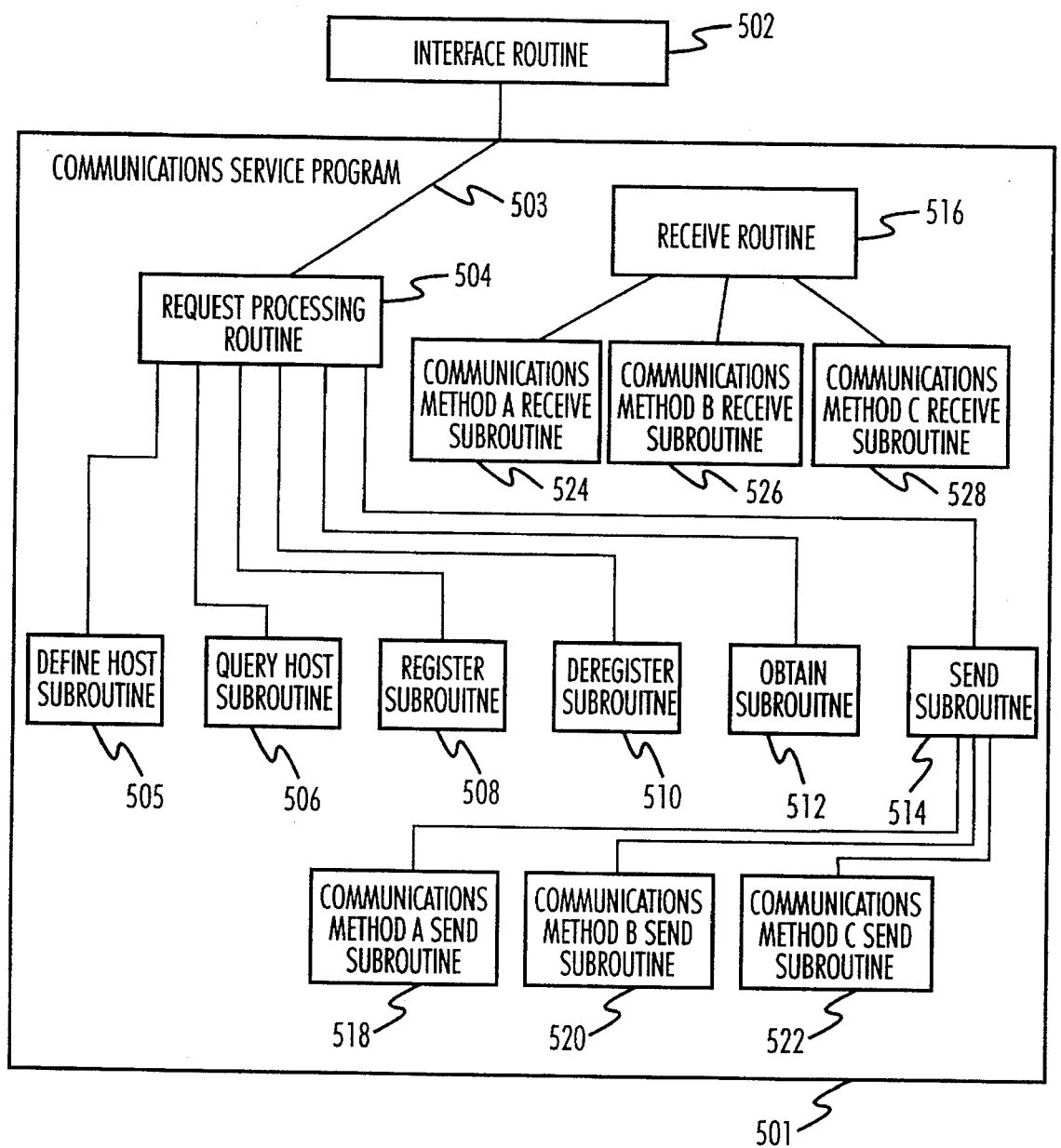
FIG. 5 is a hierarchial block diagram of the communications service program of the present invention.

Referring to FIG. 5, a hierarchial block diagram of the present invention is illustrated, wherein each box represents a routine or subroutine component of the communications program, and the lines represent interface calls. System 500 is comprised of the communication service program 501 and the interface routine 502. The communications service program 501 is comprised of two main routines: request processing routine 504, and receive routine 516.

In the preferred embodiment of the present invention, interface routine 502 interfaces with the Host Software Component (HSC) application program described above. However, as would be apparent to a person skilled in the relevant art, the interface routine of the present invention may be designed to interface with any applications program described above. Interface routine 502 calls the request processing routine 504 of the communications service program 501 via call line 503, and passes a data structure described above as the parameter list. In the preferred embodiment of the present invention, interface routine 502 is the method by which the present invention builds the above data structure to be passed to the communications service program 501 and also calls the request processing routine directly. However, as would be apparent to a person skilled in the relevant art, the application programs may be designed to build the dam structure themselves and to form the call to the request processing routine 504 directly.

A. Request Processing Routine

Figure 6:
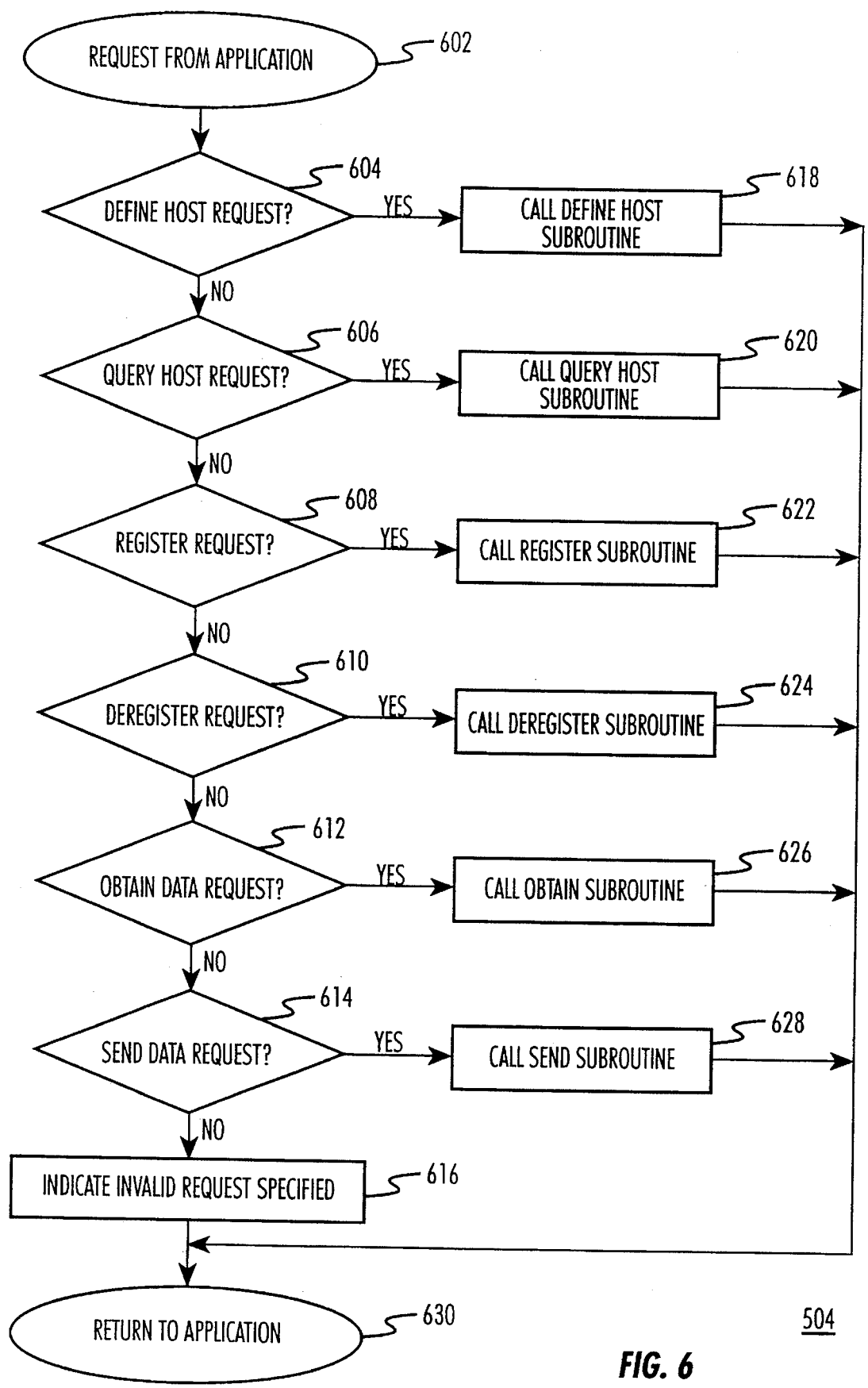
FIG. 6 is a flowchart of the request processing routine of the communications service program of the present invention.

The request processing routine 504 is illustrated in FIG. 6. When the interface routine 502 calls the request processing routine 504, step 602, it passes the parameter list to the request processing routine 504. The request processing routine 504 determines the type of request that is being received (see Table 1, field 2), and calls the associated subroutine to process the request. The request processing routine 504 first determines if the request is a define host request, step 604. If so, the request processing routine 504 calls the define host subroutine 505, step 618. If not, the request processing routine 504 then determines if the request is a query host request, step 606. If so, the request processing routine 504 then calls the query host subroutine 506, step 620. If the request is not a query host request, then the request processing routine 504 determines if the request is a register request, step 608. If so, the request processing routine 504 calls the register subroutine 508, step 622. If not, the request processing routine 504 then determines if the request is a deregister request, step 610. If so, the request processing routine 504 then calls the deregister subroutine 510, step 624. If the request is not a deregister request, then the request processing routine 504 determines if the request is an obtain data request, step 612. If so, the request processing routine 504 then calls the obtain subroutine 512, step 626. If not, then the request processing routine 504 determines if the request is a send data request, step 614. If so, then the request processing routine 504 calls the send subroutine 514, step 628. If not, then the request is not one of the six valid requests which are possible in the preferred embodiment of the present invention. As such, the request processing routine 504 then indicates that an invalid request has been specified, step 616. After the request processing routine calls the specified subroutine or indicates that the request is invalid, it then returns control to the calling application program, step 630.

B. Register Subroutine

Figure 7:
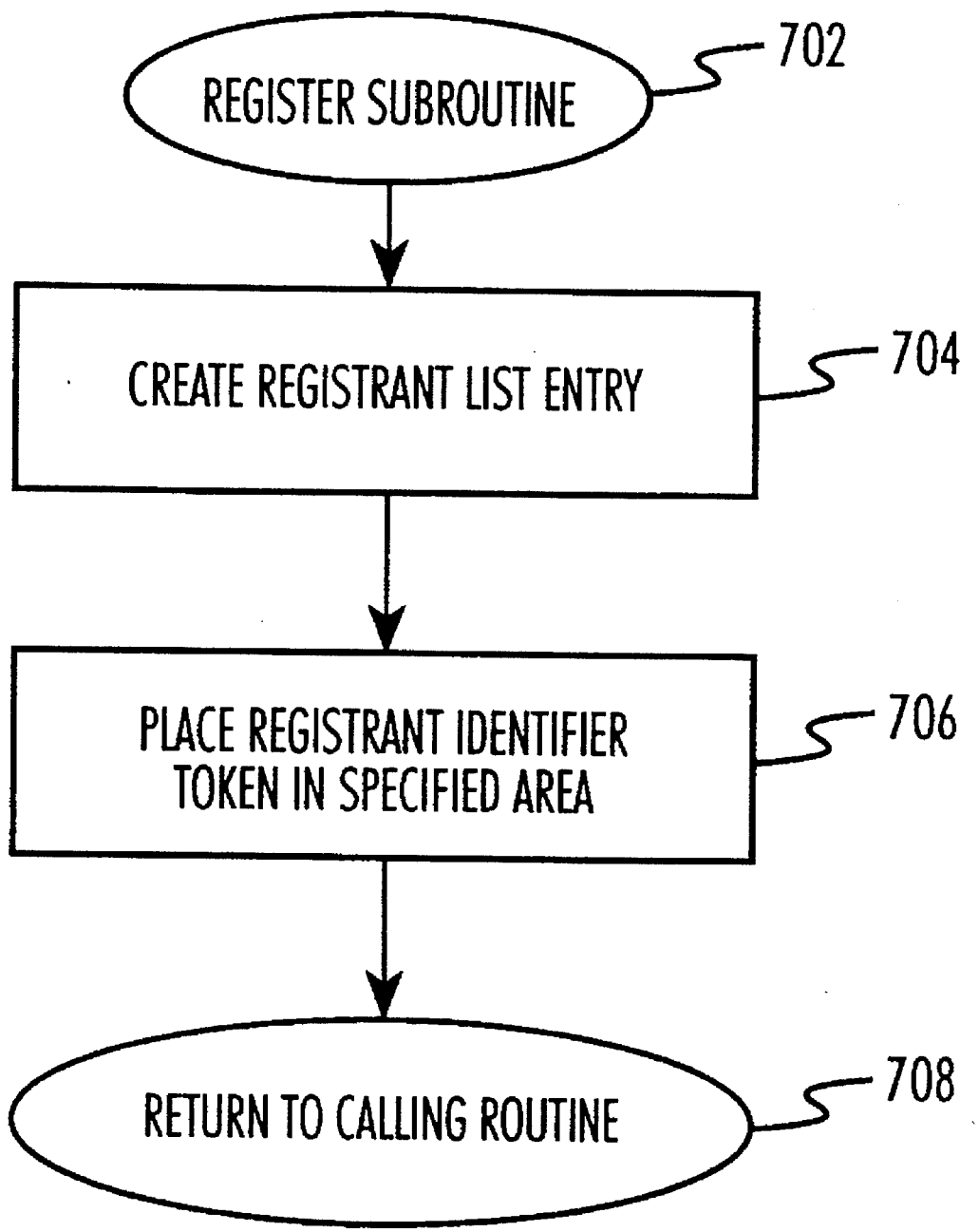
FIG. 7 is a flowchart of the register subroutine of the communications service program of the present invention.

Referring to FIG. 7, the register subroutine 508 is illustrated. The register subroutine 508 is called by the request processing routine 504. When the register subroutine 508 is called, step 702, it first creates a registrant list entry for the calling application in the registrant list, step 704. Each registrant list entry contains information pertaining to the requesting application. In the preferred embodiment, the registrant list entry contains (1) the registrant identifier token which identifies the requesting application process, and (2) a pointer to the requesting application's ECB (see Table 1, fields 6 and 7). As noted in Table 1, a single application may have more than one process which may need to register for the same or different messages. Next, the unique registrant identifier token which is associated with this list entry is placed into a specified area of the parameter list for access by the application program, step 706. When control is returned to the calling routine, step 708, the unique registrant identifier token is passed back to the application program where it is saved for use with future requests.

C. Deregister Subroutine

Figure 8:
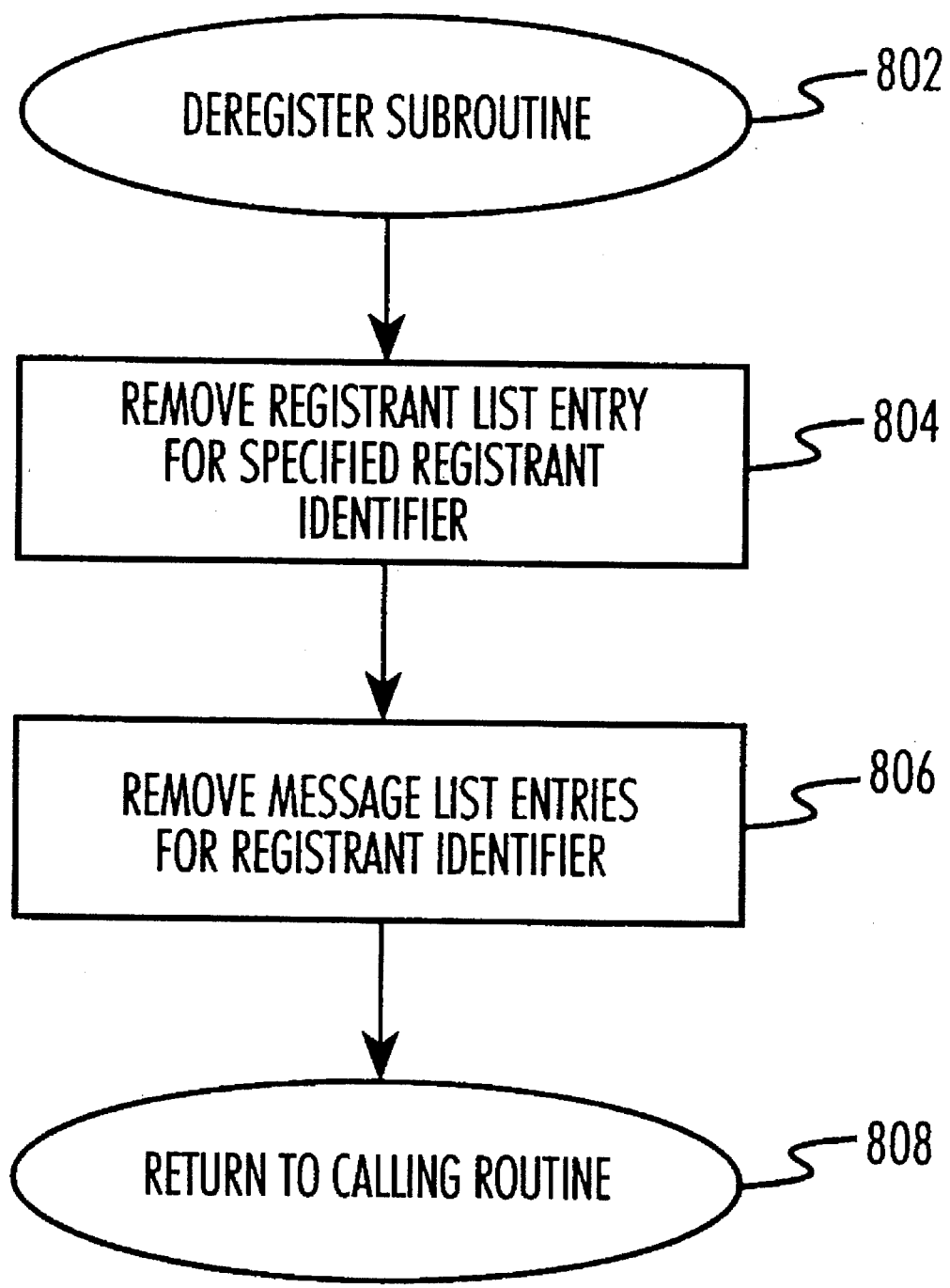
FIG. 8 is a flowchart of the deregister subroutine of the communication service program of the present invention.

Referring to FIG. 8, the deregister subroutine 510 is illustrated. The deregister subroutine removes the previous registration for the identified application process which had issued a register request. Once the deregister subroutine 510 removes the previous registration, the communications service program will no longer notify that particular application process of messages received from other host computer systems. Thus, a particular application process issues the deregister request when it no longer wants to receive data.

For incoming messages, the present invention creates a message list for placing the received message data. The message list contains message list entries which contain the message data, registrant identifier token of the receiving application process(es), host system identifier of the sending host system, and a message type code. In the preferred embodiment of the present invention, each message list entry contains the registrant identifier token for a single receiving application process. However, as would be apparent to a person skilled in the relevant art, the message list entry may contain the registrant identifier token for all application processes which are to receive the associated message data.

When the deregister subroutine 510 is called, step 802, it is passed the registrant identifier token from the parameter list (see Table 1, field 7). First, the deregister routine 510 removes the registrant list entry indicated by the registrant identifier originally created by the register subroutine 508, step 804. All message list entries associated with the registrant identifier are then removed, step 806. The deregister subroutine then returns control to the request processing routine 504, step 808.

D. Obtain Subroutine

Figure 9:
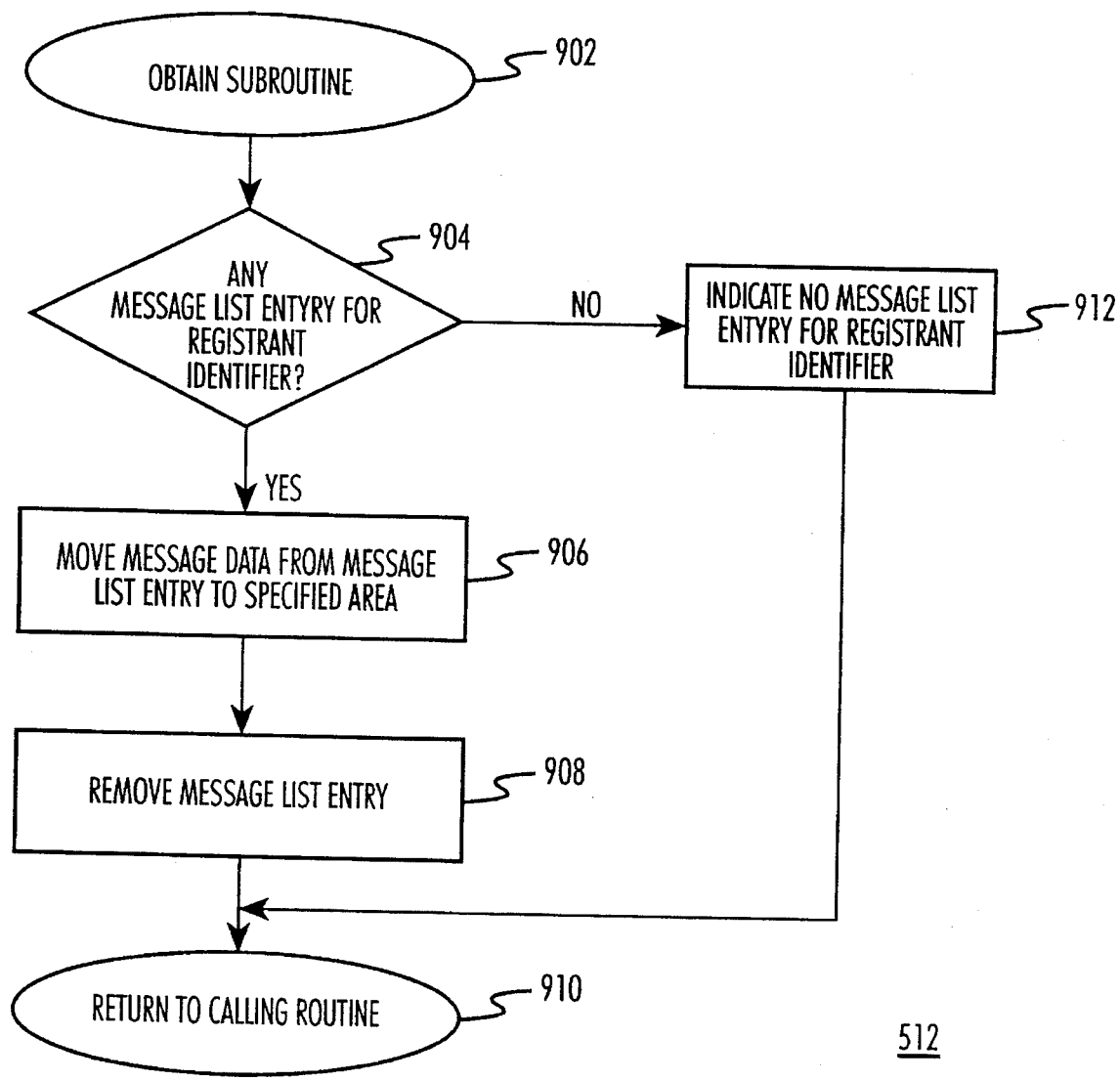
FIG. 9 is a flowchart of the obtain subroutine of the communications service program of the present invention.

Referring to FIG. 9, the obtain data (or obtain) subroutine 5 12 is illustrated. When called by the request processing routine 504, the obtain subroutine 512 checks for a message list entry for the specified registrant identifier by searching for a message list entry with a matching registrant identifier token, step 904. If there is no message list entry for the specified registrant identifier, the obtain subroutine 512 indicates this in its return to the calling application program, step 912.

If a message list entry exists, the received message data is placed in the data area specified in the parameter list (see Table 1, fields 4 and 5), step 906, and the message list entry is removed, step 908. After the message list entry is removed, the obtain subroutine 512 returns control to the request processing routine 504, step 910.

E. Send Subroutine

Figure 10:
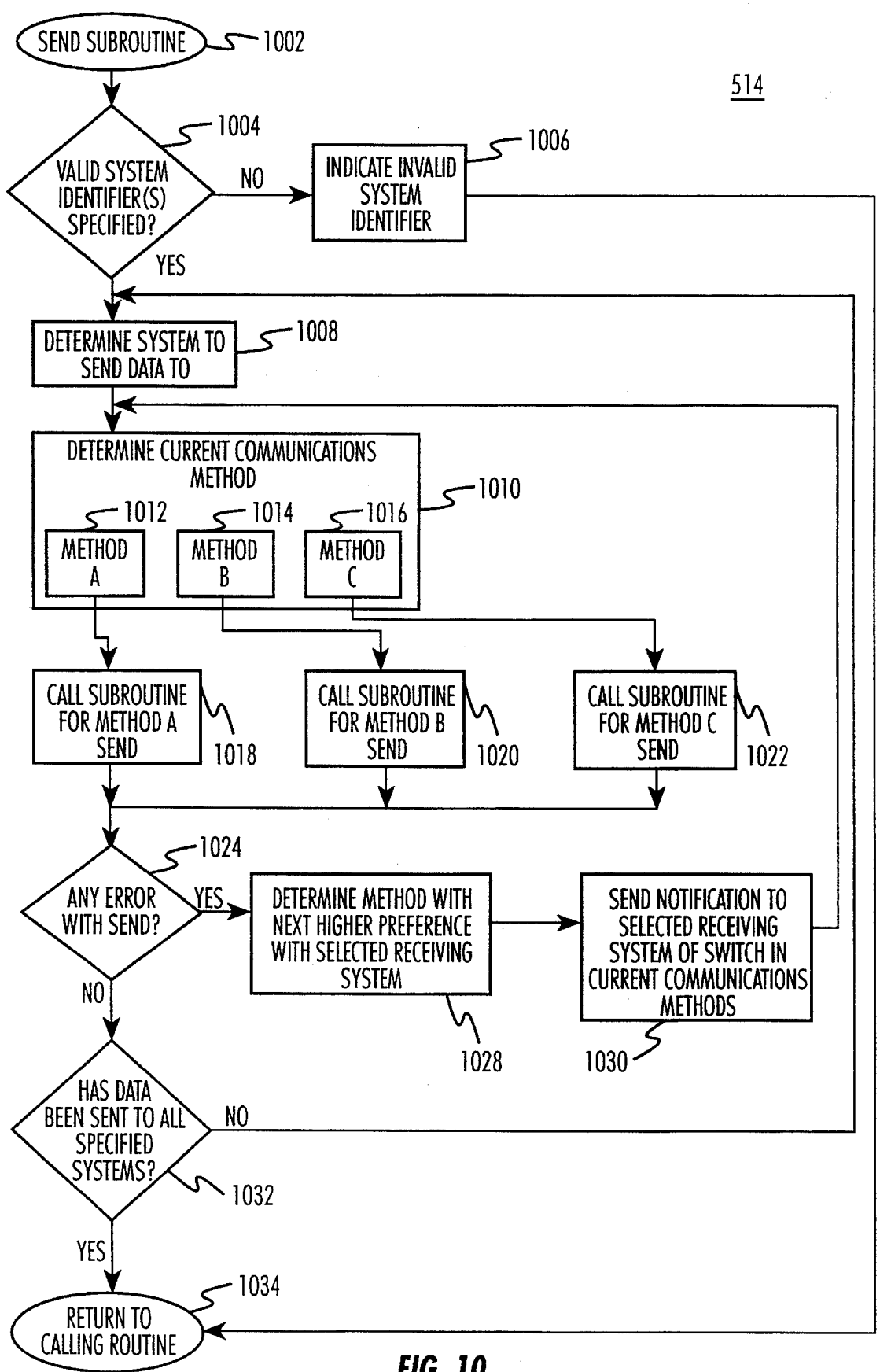
FIG. 10 is a flowchart of the send subroutine of the communications service program of the present invention.

Referring to FIG. 10, the send subroutine 514 is illustrated. When the request processing routine 504 calls the send subroutine 514, step 1002, the send subroutine 514 validates the system identifiers which have been received in the parameter list (see Table 1, field 12), step 1004. If any of the system identifiers are not valid, control is immediately returned to the request processing routine 504 with an indication that there has been an error in the system identifiers, step 1006. If the system identifiers are all valid, then the send subroutine 514 determines which of the specified host computer systems to send the data to, step 1008. Then the send subroutine 514 determines which of the available communications methods will be the current communication method used with the selected receiving system (see Table 1, field 9), step 1010. As discussed above, this is the highest preferred communications method commonly available for the sending and receiving host computer systems. In the present example, there are three communication methods which are available between host computer system A 202 and host computer system B 204. They are communications method A 234, communications method B 236, and communications method C 238, represented by boxes 1012, 1014, and 1016, respectively.

Once the send subroutine 514 determines which of the available communications methods is the current communications method, it then calls the specific communications method send subroutine which is associated with the current communications method. In the present example where there are three available communications methods, the send subroutine 514 may call the communications method A send subroutine, step 1018, the communications method B send subroutine, step 1020, or it may call the communications method C send subroutine, step 1022. In the present example, communications method send subroutine A 1018 is called since communications method A 234 was the highest preference communications method available. The operation of these communications method send subroutines is described in further detail below with reference to FIG. 11. Once called, the communications method send subroutine sends the data according to the protocol of the selected communications method.

When the selected communications method send subroutine returns control to the send subroutine 514, the send subroutine 514 then checks if an error had occurred with the sending of dam, step 1024. If an error has occurred which the communications service program cannot recover from, the send subroutine 514 then determines the communications method with the next highest preference which is available with the selected receiving host computer system, step 1028. The send subroutine 514 then notifies the receiving host computer system that there will be a switch in the current communication method, step 1030. Control is then returned to step 1010 wherein the send request from the application program is processed again.

If no error has occurred, step 1024, the send subroutine 514 then checks to determine if it should send the dam to another host computer system by examining the remaining host system identifiers, if any (see Table 1, field 12), step 1032. If the send subroutine 514 is required to send the data to an additional host computer system, then control is returned to step 1008 wherein the send subroutine 514 then determines the next host computer to send the data to, and the process is repeated. When all specified and available host computer systems have been sent the data, the send subroutine 514 returns control to the request processing routine 504, step 1034.

F. Communications Method Send Subroutines

Figure 11:
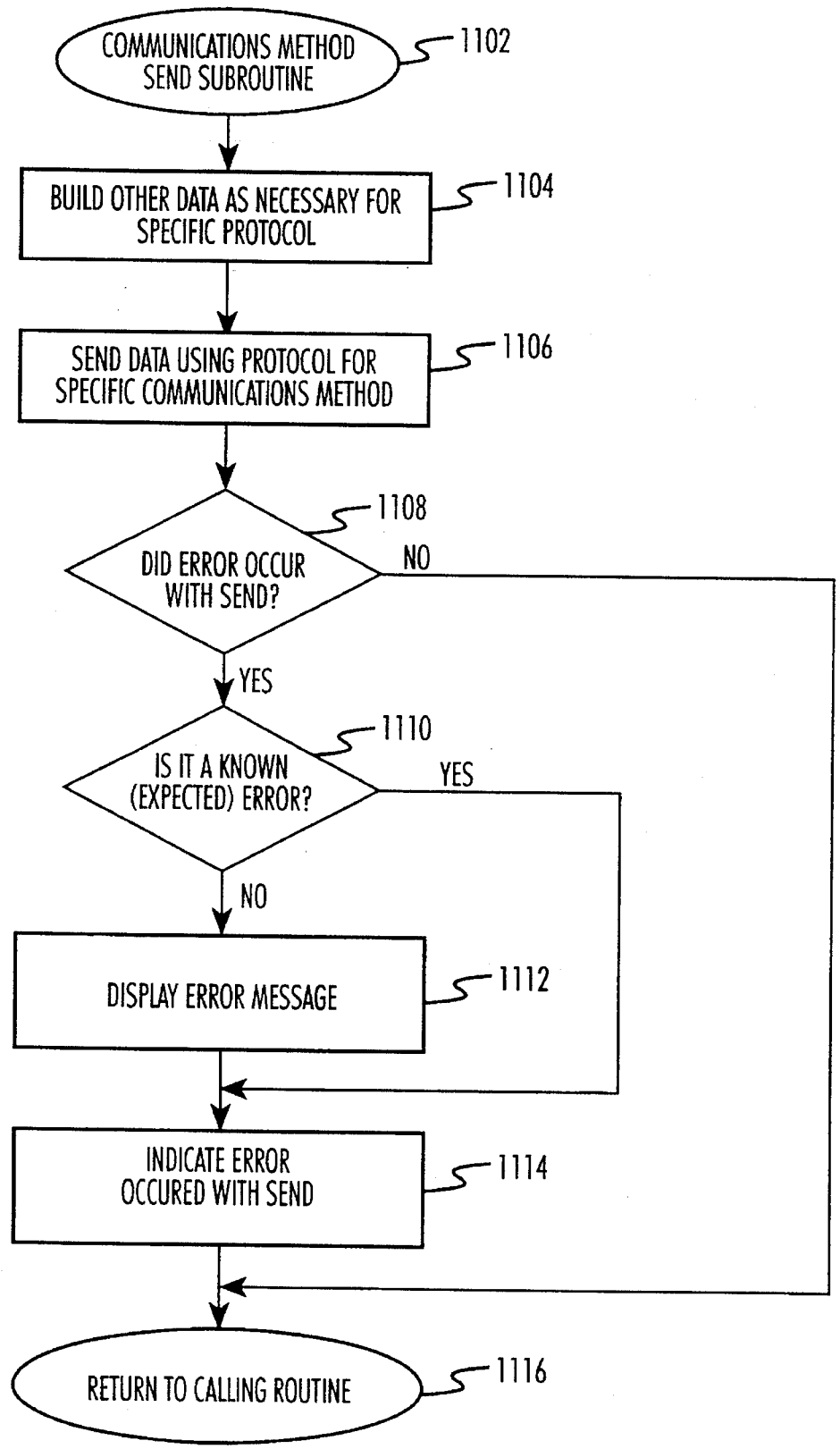
FIG. 11 is a flowchart of a generic communications method send subroutine called by the communications service program of the present invention.

FIG. 11 illustrates the general logic for the communications method send subroutines. When a communications method send subroutine is called, step 1102, the communications method send subroutine first builds any necessary protocol or header information necessary to communicate via that specific communications method, step 1104. Then, the data is sent to the specified host computer system using the protocol for the specified communications method, step 1106. If no error occurred with the send, step 1108, the communications method send subroutine then returns control to the send subroutine 514, step 1116.

If an error occurred with the send, step 1108, the communications method send subroutine determines if it is a known (expected) error, step 1110. Each separate communication send subroutine determines the errors which are expected for the protocol being used. Conditions which may be designated as known or expected are unavailable communications method, communications connection not completed, etc. If an error was a known error, then the communications method send subroutine sets a return code recognized by the send subroutine 514 indicating the type of error, step 1114, and returns control to the send subroutine 514, step 1116.

If the error is unknown, the communication method send subroutine displays a message containing the communications method attempted and the associated error code(s) encountered, step 1112. The communications method send subroutine then indicates that an error occurred with the send, step 1114, upon return to the send subroutine 514, step 1116.

In the present example, communications service program 218 calls the communication method send subroutine for communications method A 234. More specifically, as described with reference to FIG. 1, the communications methods used by the preferred embodiment of the present invention are the VTAM, CDS and LMU communications methods. The communications method send subroutine for communicating over the VTAM and LMU communications methods are described below.

The VTAM communications method send subroutine first builds a VTAM APPCCMD logical record which consists of a 2-byte field indicating the entire length of the logical record, followed by the actual data to be transmitted to the receiving host computer system. The VTAM communications method send subroutine then issues the VTAM macro below. The operands which specify fields which are application-specific are not illustrated.
APPCCMD   CONTROL=SEND,QUALIFY=DATAFLU, OPTCD=SYN
The macro calls the VTAM routine to actually send the data to the receiving system and wait for a response. Upon return from the VTAM routine, the VTAM communications method send subroutine tests for a zero return code which indicates if an error occurred with a VTAM transmission. If the return code is not zero, the VTAM communications method send subroutine displays a message indicating an error occurred with a VTAM SEND request and the return codes from the VTAM routine. A return code is then set to the calling send subroutine to indicate that an error has occurred. Note that the generic communications method send subroutine described above contained processing for when known errors occur. In the VTAM communications method, however, there are no errors which have a "known" designation, so the VTAM communications method send subroutine does not perform the processing indicated in block 1110.

The LMU communications method send subroutine first builds an LMU host-to-host message buffer which consists of a 2-byte field indicating the message subtype, followed by the actual data to be sent to the receiving system. The LMU communication method send subroutine then issues the following LMU service macro. The operands which are application-specific are not illustrated.
LMURQST SNDHOST
This calls the LMU server routine to actually send the data and wait for a response. Upon return form the LMU server routine, the LMU communications method send subroutine tests for a zero return code which indicates if an error has occurred with the data transmission. If the return code is not zero, the LMU communications method send subroutine tests to determine if it is a known error. The two known error return codes are:
LMUDEAD (LMU is dead; hex 6528): LMU server program not available.
LMUELDNE (LMU does not exist; hex 6552): Specified LMU not defined.
If the error return code does not indicate either of the two above errors, then the LMU communications method send subroutine displays a message indicating an error occurred with the LMU SNDHOST request and the return code form the LMU server routine. For any nonzero return code, known or unknown, from the LMU server routine, a return code is set upon return to the send subroutine to indicate that an error has occurred.

G. Define Host Subroutine

Figure 12:
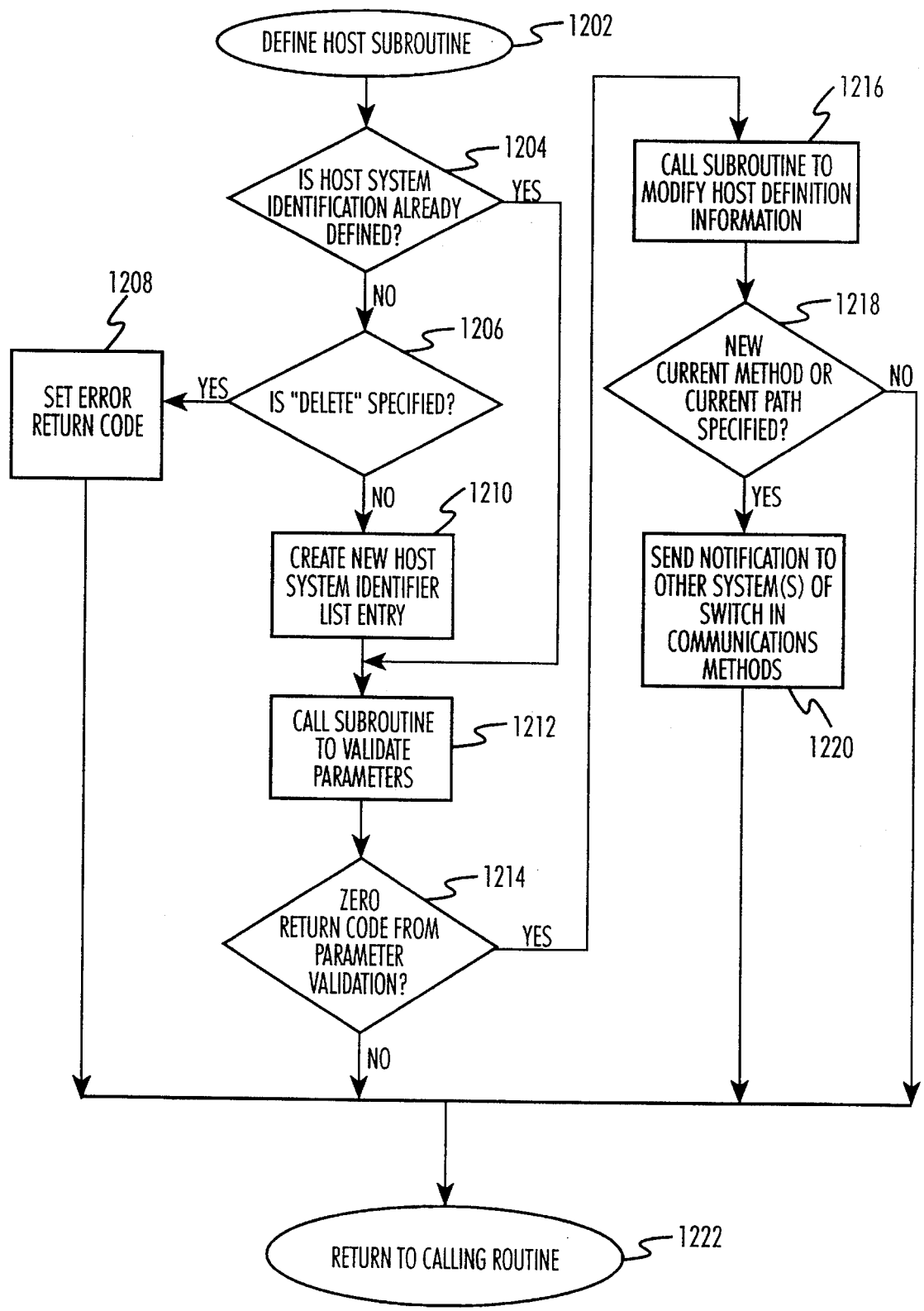
FIG. 12 is a flowchart of define host subroutine of the communications service program of the present invention.

Referring to FIG. 12, the define host subroutine 505 is illustrated. The define host subroutine defines individual host system identifiers, one for each possible host system with which the host system processing the request may communicate. The define host subroutine 505 also sets the possible communications methods and paths for the associated communications method send subroutines for communications. The define host request is issued during the initialization process or by commands entered by the operator. When a host computer system modifies its own communications information, it notifies the other systems.

When the request processing routine 504 calls the define host subroutine 505, step 1202, the define host subroutine 505 first checks if the host system identifier specified with the request has been previously defined, step 1204. This is accomplished by searching the existing host system identifier list entries for matching entries. If the host system identifier has not yet been defined, the define host subroutine 505 checks if "delete" has been specified with the request (see Table 1, field 3), step 1206. If so, an error return code is set because nothing exists to delete since the host system identifier has yet to be defined, step 1208. Control is then returned to the request processing routine 504, step 1222.

If a request to delete the host system identifier has not been specified, step 1206, then the define host subroutine 505 creates a new host system identifier list entry, step 1210. If the host system identifier has already been defined or after creating the new host system identifier list entry, the define host subroutine 505 calls a subroutine to validate the request parameters, step 1212. This parameter validation subroutine validates the parameters for the different possible communications methods. It may call separate subroutines which validate each possible parameter or set of parameters. If any parameter is invalid, an error return code is set. Next, the define host subroutine 505 determines if there has been a parameter error by examining the return code from the parameter validation subroutine, step 1214. If there was a parameter error, control is returned to the request processing routine 504 with the error return code. If all request parameters are valid, the define host subroutine 505 calls a subroutine to modify the definitions for the host system specified, step 1216. This definition modification subroutine modifies the previously defined communications method and path information. It may call separate subroutines which modify each possible parameter or set of parameters. Next, if a different current communications method or different current path is specified with the request, step 1218, the define host subroutine 505 sends notification to the other systems that the current communications method has been changed, step 1220. Control is then returned to the request processing routine 504, step 1222.

H. Query Host Subroutine

Figure 13:
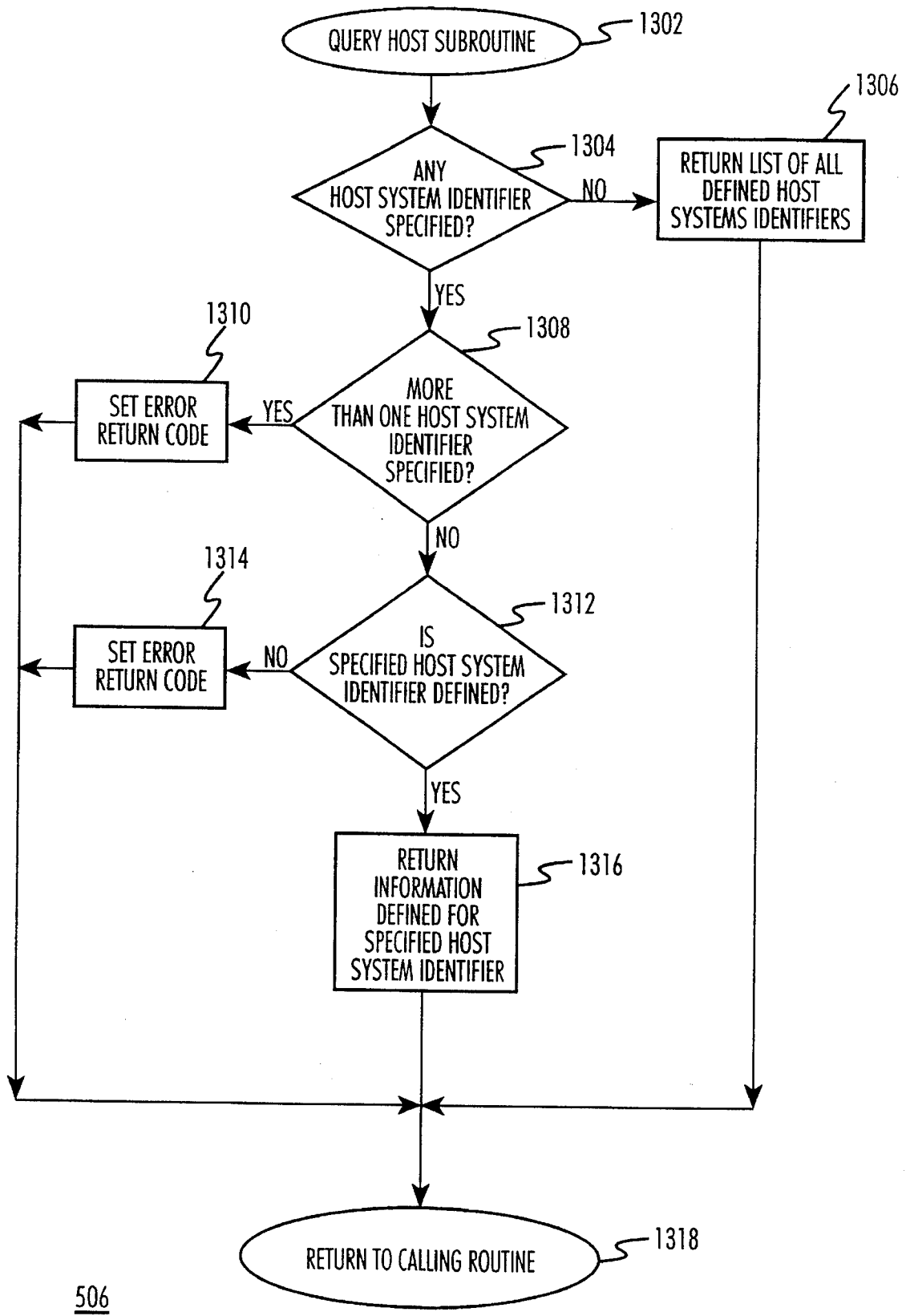
FIG. 13 is a flowchart of query host subroutine of the communications service program of the present invention.

Referring to FIG. 13, the query host subroutine 506 is illustrated. When the request processing routine 504 calls the query host subroutine 506, step 1302, the query host subroutine 506 first checks if a host system identifier has been specified with the request, step 1304. This is accomplished by checking the parameter list (see Table 1, field 12) for a nonzero count of host system identifiers. If not, then the query host subroutine 506 returns a list of all defined host system identifiers via the same parameter list (see Table 1, field 12), step 1306, and control is returned to the request processing routine 504, step 1318. If a host system identifier is specified, step 1304, then the query host subroutine 506 checks if more than one host system identifier has been specified with the request, step 1308. This is accomplished by checking for a count greater than one of the host system identifiers in the parameter list. If so, an error return code is set, step 1310, and control is returned to the request processing routine 504, step 1316. If a single host system identifier is specified, step 1308, then the query host subroutine 506 checks the host system identifier specified with the request has been defined, step 1312. This is accomplished by searching the existing host system identifier list entries for a matching entry. If not, an error return code is set, step 1314, and control is returned to the calling routine, step 1318. If so, definition information for the specified host system identifier is returned via the same parameter list, step 1316, and control is returned to the request processing routine 504, step 1318.

I. Receive Routine

Figure 14:
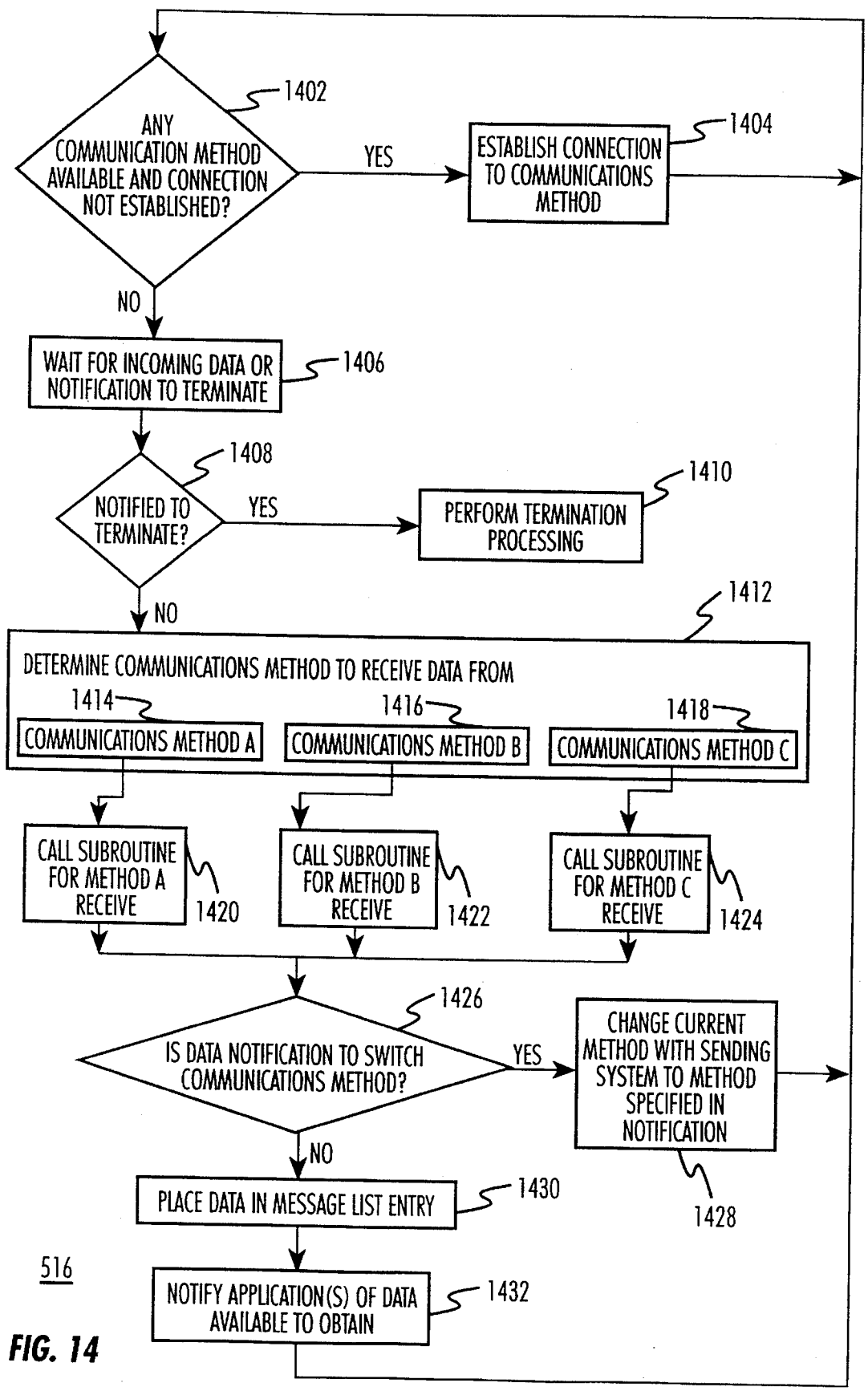
FIG. 14 is a flowchart of the receive subroutine of the communications service program of the present invention.

Referring to FIG. 14, the receive routine 516 is illustrated. The receive routine 516 is a major routine in the communications service program. The receive routine 516 is not a routine which is called. Rather, it is a separate task which is invoked and runs continuously until terminated. After the receive routine 516 is started, it checks for the availability of communications methods by examining the method and path information for its own host system identifier of the parameter list and comparing it to those communications methods with which it is presently connected, step 1402. For each communications method available, a connection is established using the protocol of the specific communications method, step 1404. After the receive routine 516 establishes a connection with the communications method, it checks again for another connection to establish, step 1402. If there are no other communications methods available for which communication has not been established, then the receive routine 516 waits for incoming data or for notification to terminate, step 1406.

The arrival of incoming data is indicated by the communications method POSTing an ECB while notification to terminate the receive routine 516 is indicated by the system POSTing an ECB. The location of the ECB is provided in the parameter list (see Table 1, field 6). The waiting period is ended when one or more ECBs have been POSTed. At this time, the receive routine 516 first determines if it has received a notification to terminate, step 1408. If so, the receive routine 516 performs the termination processing and stops execution, step 1410. If not, the receive routine 516 determines which communications method to receive data from by testing the ECB for each communications method. If the ECB for a communications method has been POSTed, the receive routine 516 calls the associated communications method (1414, 1416, or 1418) receive subroutine 1420, 1422, or 1424, to receive the data using the protocol of the specified communications method. When control is returned to the receive routine 516 from the specified communications method receive subroutine, the receive routine 516 checks to determine if there has been a notification to switch communications methods, step 1426. If so, then the receive routine 516 changes to the new communications method, step 1428, and repeats the above processing.

If there is no notification to switch communications methods, step 1426, the receive routine 516 places the data in the message list entry, step 1430, and notifies the receiving application program(s) that there is data available for them to obtain based on the registrant identifier token (see Table 1, field 7), step 1432. The process is then repeated with step 1402.

While the invention has been particularly shown and described with reference to preferred embodiments thereof, it will be understood by those skilled in the art that various changes in form and detail may be made therein without departing from the spirit and scope of the invention.

What is claimed is:

1. A computer-based communications system having a plurality of host computer systems for enabling communication of data between a sending application program residing on a sending host computer system and a receiving application program residing on a receiving host computer system via a plurality of available communications methods, said communications system comprising:

communications servicing means associated with the sending host computer system for processing communications requests from the sending application program, said communications requests received by said communications servicing means from said sending application program over a single interface independent of the communication method used by said communications servicing means, said communications servicing means comprising, means for determining which of the plurality of communications methods are available, wherein each of the plurality of available communications methods define a distinct protocol;

means for selecting an available communication method with a highest prioritization based on user-assigned preferences;

a data sending means for sending said data to the receiving host computer system, identified by said communications request, utilizing said selected communication method; and switching means for automatically selecting an alternative communications method that has a next highest prioritization among all remaining available communications methods if said selected communication method fails, said alternative communications method having a next-lower priority than said selected communication method.

2. The system of claim 1, wherein said communications servicing means further comprises:

destination identifying means for receiving and validating destination identifiers in said communications request; and means for determining if an error occurred in sending said data using an error detection capability of said selected communication method.

3. The system of claim 2, wherein said communications servicing means further comprises:

a notification means for notifying the receiving host computer system via said alternative communications method that future communications between the sending host computer system and the receiving host computer system shall occur via said alternative communications method.

4. The system of claim 3, further comprising:

second communications servicing means associated with the receiving host computer system for receiving said data from the sending host computer system over the plurality of available communications methods, said second communications servicing means comprising, communications polling means for periodically attempting to establish and maintain communications with the sending host computer system via each of the plurality of available communications methods using the protocol of each of the plurality of available communications methods; and communications method receiving means for receiving data over said selected communications method using the protocol of said selected communications method.

5. The system of claim 4, wherein said second communications servicing means further comprises:

notification processing means for receiving and processing said notification from said communications servicing means via said alternative communications method; and received data buffer means for storing said data received from the sending host computer system.

6. The system of claim 5, wherein said second communications servicing means further comprises:

means for receiving a registrant identifier token identifying the receiving application program, said second communication service means notifying the receiving application program when said data from the sending host computer system is received by the receiving application program, and for placing said received data in a first memory location;

deregister means for preventing said second communications service means from notifying the receiving application program when said received data is received for the receiving application program and for removing all of said data for the receiving application program from said first memory location; and obtain data means for retrieving said received data from said first memory location and for transferring said data to a second memory location, said second memory location designated by the receiving application program.

7. The system of claim 6, wherein said communications servicing means further comprises:

define host means for defining each of the plurality of host computer systems with which the sending host computer system may communicate, and for determining available communications methods that the sending host computer system can use.

8. The system of claim 1, wherein said communications service means further comprises:

application request processing means for receiving and processing requests from said single interface and for invoking the processing of a define host means, a registration means, a deregister means, an obtain data means, and said data sending means.

9. The system of claim 7, further comprising a second sending application program residing on the receiving host computer system and a second receiving application program residing on the sending host computer system, said second communications servicing means processing a second communications request from said second sending application program over a second single interface independent of the communication method used by said second communications servicing means, wherein said second communications receiving means further comprises:

second means for determining which of the plurality of communications methods supporting communications between the receiving host computer system and the sending host computer system are available;

second means for selecting an available communication method for communication with the sending host computer system, wherein the selection is based on user-assigned preferences; and second data sending means for sending second data to the sending host computer system utilizing said second available communication method.

10. The system of claim 9, wherein said second data sending means comprises:

second destination identifying means for receiving and validating destination identifiers in said second communications request; and second means for determining if an error occurred in sending said second data using error detection capability of said selected communication method.

11. The system of claim 10, wherein said second communications servicing means further comprises:

second switching means for automatically selecting a second alternative communications method from the plurality of available communications methods; and second notification means for notifying the sending host computer system via said second alternative communications method that future communications between the receiving host computer system and the sending host computer system shall occur via said second alternative communications method.

12. The system of claim 11, wherein said second service communications means further comprises:

second define host means for defining each of the plurality of host computer systems with which the receiving host computer system may communicate, and for determining available communications methods that the receiving host computer system can use.

13. The system of claim 9, wherein said second communications service means further comprises:

second application request processing means for receiving and processing requests from said second single interface and for invoking the processing of a second define host means, second registration means, second deregister means, second obtain data means, and second data sending means.

14. The system of claim 12, wherein said first communications servicing means further comprises, second communications polling means for periodically attempting to establish and maintain communications with the receiving host computer system via each of the plurality of available communications methods using the protocol of each of each of the plurality of available communications methods; and second communications method receiving means for receiving data over said selected communications method using the protocol of said selected communications method.

15. The system of claim 14, wherein said first communications servicing means further comprises:

second notification processing means for receiving and processing said notification from said second communications servicing means via said alternative communications method; and second received data buffer means for storing said data received from the receiving host computer system.

16. The system of claim 15, wherein said first communications servicing means further comprises:

second means for receiving a second registrant identifier token identifying the second receiving application program, said first communication service means notifying the second receiving application program when said data from the receiving host computer system is received for the second receiving application program, and for placing said received data for the second receiving application program in a third memory location;

second deregister means for preventing said first communications service means from notifying the second receiving application program when said received data is received for the second receiving application program and for removing all of said data for the second receiving application program from said third memory location; and second obtain data means for retrieving said received data from said third memory location and for transferring said data to a fourth memory location, said fourth memory location designated by the second receiving application program.

17. A computer-based communications system having a plurality of host computer systems for enabling communications between a sending application program residing on a sending host computer system and a receiving application program residing on a receiving host computer system via a plurality of communications methods, said communications system comprising:

first communications servicing means associated with the sending host computer system for processing communications requests from the sending application program, said first communications servicing means comprising, initialization means for determining which of the plurality of communications methods supporting communications between the sending host computer system and the receiving host computer system are available, and for prioritizing said available communications methods based on user-assigned preferences;

selecting means for selecting a selected communications method having a protocol and an error detection capability, for communications with said receiving host computer system, said selected communications method being a highest priority communications method of said available communications methods;

selected communications method means for communicating over said selected communications method using said protocol of said selected communications method and for determining if an error occurred in said sending of said data using said error detection capability of said selected communications method;

communications method switching means for automatically selecting an alternative communications method from said available communications methods, said alternative communications method having a next-lower priority than said selected communications method; and notification means for notifying said receiving host computer system via said alternative communications method that future communications between the sending host computer system and the receiving host computer system shall occur via said alternative communications method; and second communications servicing means associated with the receiving host computer system for receiving said data from the sending host computer system over the plurality of host communications methods, said second communications servicing means comprising, communications polling means for periodically attempting to establish and maintain communications with the sending host computer system via each of the plurality of communications methods using the protocol of the each of said communications methods;

communications method receiving means for receiving data over the plurality of communications methods using the protocol of each of said plurality of communications methods; and first notification processing means for receiving and processing said notification from said first communications service means via said alternative communications method.

18. A computer-based communications service method for communicating between a sending application program residing on a first host computer system and a receiving application program residing on a second host computer system, said sending application program communicating through a first communications service means and the second application program communicating through a second communications service means, the first host computer system coupled to the second host computer system by a plurality of communications methods said computer communications service method comprising the steps of:

(1) receiving a send data request in a first communications service means from the sending application to send data to a plurality of host computer systems including the second host computer system, said send data request received over a single interface independent of the communication method used by said first communications service means;

(2) selecting the second host computer system as a host computer system to receive said data;

(3) selecting a highest priority communications method from the plurality of communications methods available to transmit said data to the second host computer system, wherein each of the plurality of communications methods available define a distinct protocol;

(4) sending data to the second host computer system over said selected communications method;

(5) completing the sending of said data to the second host computer system over an alternative communications methods if an error occurs over said highest priority communications method, wherein said alternative communications method is the communication method having a next lower priority from said plurality of communications methods.

19. The method of claim 18, wherein said step 5 further comprises the steps of:

(a) notifying the second host computer system via said alternative communications method that the first host computer system will send remaining portion of said data over said alternative communications method;

(b) sending said remaining portion of said data to the second host computer system over said alternative communications method; and, (c) reporting the status of said sending of said data to the second host computer system.

20. The method of claim 19, further comprising the steps of:

(6) selecting the communications method selected by said first communications service means at a second communications service means residing on the second host computer system.

21. A computer-based communications system having a plurality of host computer systems for enabling communications between a sending application program residing on a sending host computer system and a receiving application program residing on a receiving host computer system via a plurality of communications methods, said communications system comprising:

sending communications servicing means associated with the sending host computer system for sending a message generated by the sending application program over one or more communications methods to the receiving application program, including, initialization means for determining which of the plurality of communications methods supporting communications between the sending host computer system and the receiving host computer system are available, and for prioritizing said available communications methods, data sending means for sending data to the receiving host computer system utilizing a highest priority available communications method, and for automatically switching among said available communications methods in accordance with said prioritization, and notification sending means for notifying said receiving host computer system via said second available communications method that future communications between the sending host computer system and the receiving host computer system shall occur via said second communications method; and receiving communications servicing means associated with the receiving host computer system for receiving said data transmission from the sending host computer system utilizing said selected communications method, said second communications servicing means, including, data receiving means for receiving said data transmission from the sending host computer system utilizing said selected communications method, and notification processing means for receiving and processing said notification from said sending communications service means via said selected communications method, and for automatically switching communications methods in accordance with said notification.

* * * * *